FIGURE 1

SPRAY DRIED NON-HEAT COAGULATED LIGNIN

FIGURE 2

SPRAY DRIED HEAT COAGULATED LIGNIN

FIGURE 3

SPRAY DRIED HEAT COAGULATED LIGNIN

FIGURE 4

SPRAY DRIED HEAT COAGULATED LIGNIN

FIGURE 5

SPRAY DRIED HEAT COAGULATED LIGNIN

FIGURE 6

VARIATION OF SURFACE AREA OF LIGNIN WITH PARTICLE SIZE

United States Patent Office 3,808,192
Patented Apr. 30, 1974

3,808,192
PRODUCTION OF HIGH SURFACE AREA LIGNINS BY SPRAY DRYING
Mitchell S. Dimitri, Charleston, S.C., assignor to Westvaco Corporation, New York, N.Y.
Filed Apr. 11, 1973, Ser. No. 349,981
Int. Cl. C07g 1/00
U.S. Cl. 260—124 R                8 Claims

ABSTRACT OF THE DISCLOSURE

A process for making large surface area lignins which comprises precipitating particles of lignin from solution, partially coagulating said particles by heat treatment, and drying the prior coagulated particles.

The mechanics of the prior coagulation is to effectuate an impedance of the normal coalescing of dried material. The prior coagulation provides a particulate skeleton structure which hinders the close packing formation so common when drying untreated lignin particles.

The hindered coalesced spray dried lignins create a surface area much greater than previously achieved, i.e. 120 square meters per gram.

BACKGROUND OF THE INVENTION

The present invention relates to a process for making large surface area lignins specifically and particularly designed for commercial adsorption medium manufacture.

The phenomenon known as adsorption occurs at the surfaces of a solid or liquid in contact with another medium, resulting in an accumulation or increased concentration of molecules from that medium in the immediate vicinity of the surface. In order to increase the adsorption potential of a substance, particularly that of solid substances, efforts have been undertaken to increase the surface area per unit weight of the substances in question. A solid substance commonly used for adsorption is carbon, i.e. activated carbon.

One of the underlying mechanisms of either chemical or physical adsorption is the attractive forces between the substances involved. By varying the adsorbing substance or medium a more selective adsorption process can be achieved. Various substances have been investigated as potential surfaces on which useful adsorption could be achieved. Because of the highly complex chemical composition of lignin, the potential of lignin as an adsorption medium has gained recognition in the chemical industry.

Lignin is the non-carbohydrate portion of the cell wall of plant material which is usually defined as the residue left after hydrolysis of plant material with strong acid. It is an amorphous material of high molecular weight, built up of phenylpropane units containing the major portion of the methoxyl groups present in plant material, and is readily soluble in hot alkali and sulfite. It is not a compound but a mixture varying in composition with methods of isolation and with species of the tree or other lignified plant material.

Generally speaking the chief source of lignin today is from the paper industry as a by-product during chemical pulping operations, using the soda the sulfite process, and the kraft process. In the alkaline processes lignin appears in the spent liquors as alkali lignin and thiolignin in the kraft process. In the acid or neutral sulfite process the lignin is sulfonated to ligno sulfonic acid and occurs in the spent liquors as calcium, ammonium, magnesium or sodium salts of these acids. Methods of recovering lignin from spent liquors are well known and two of such methods are set forth in U.S. Pats. 3,048,576 and 2,997,466.

Basically the recovery processes disclosed in U.S. Pats. 3,048,576 and 2,997,466 involve the precipitation of lignin from the lignin-containing solution, i.e. the spent liquor. After isolation from the spent liquor, lignin is generally only soluble in a basic solution and, upon varying the pH towards neutral or acidic, the lignin appears as precipitate. This wet precipitate, termed lignin slurry by the industry, had a high surface area, however a dry lignin having a comparable surface area was difficult to achieve using conventional industrial drying processes. The theory generally accepted for the drastic reduction of surface area from the wet to the dry lignin is the coalescing effect inherent in drying. This coalescing effect results from the attractive forces between particles.

This invention relates to increasing the surface area of dry lignin by altering the conditions under which the unadvantageous coalescing effect occurs. At the present time several methods are available to hinder the coalescing phenomenon and thereby produce the more desirable high surface area lignin. In particular U.S. Pats. Nos. 3,699,091 and 3,699,093 offer solutions to this problem.

U.S. Pat. No. 3,699,091 relates to a process whereby the interspersion of barrier materials into lignin slurries reduces coalescence of the lignin particles during drying and the barrier material is later removed by volatilization, decomposition or dissolving leaving lignin particles having relatively large surface areas.

U.S. Pat. No. 3,699,093 is a process directed to the use of water-immiscible volatile organic liquids that have a boiling point above 230 degrees F., that are not lignin solvents and form oil-in-water systems to reduce lignin particles contact during drying thereby reducing coalescence, and yielding high surface area lignin upon drying.

Although the above noted drying methods produce good lignin products of relatively high surface area, the economics, simplicity and adaptability to the industry of the present invention has yet to be surpassed.

The mechanism for hindering the coalescing between particles of slurry can be easily achieved by heating with injected steam to a temperature where the surface of the particles becomes sticky. Moreover the process as designed is such that various modified lignins can also be selectively processed by simply varying the coagulation temperature. It will become apparent in the discussion of the preferred embodiment that the present invention is easily adapted to a continuous process for the manufacture of large surface area lignins.

In conclusion it is an object of this invention to provide a process for producing dry large surface area lignins. Additionally, it is an object of this invention to produce large surface area lignins by hindering the coalescing forces between particles during drying. Various other objects, distinctions and advantageous features of the present invention will become apparent from the description of the preferred embodiment below.

BRIEF DESCRIPTION OF THE DRAWINGS

FIG. 1 is an electron micrograph of particles of spray dried non-heat coagulated lignin magnified 16,000 times.

FIG. 2 is electron micrograph of particles of spray dried heat coagulated lignin magnified 46,700 times.

FIG. 3 is an electron micrograph of particles of spray dried heat coagulated lignin magnified 9,900 times.

FIG. 4 is an electron micrograph of particles of spray dried heat coagulated lignin magnified 12,800 times.

FIG. 5 is an electron micrograph of particles of spray dried heat coagulated lignin magnified 9,900 times.

FIG. 6 is a graph of the variation of surface area of lignin plotted against particle size.

DESCRIPTION OF THE PREFERRED INVENTION

The starting point of the present invention process occurs after the lignin has been separated from its source, i.e. plant matter. However in order to give a more complete description of the transgression from the source of lignin up to the starting raw material of the present invention, the following is presented.

The chief source of lignin is the spent liquor produced during the chemical pulping operations of plant material in the manufacture of paper. After the chemical pulping operations the spent liquor is separated from the pulp by conventional filtering means and the pH of the spent liquor is reduced to produce a precipitate. This precipitate, which is the lignin, is then filtered from the spent liquor. The lignin can be dried forthwith or acidified to produce the Indulin AT, or acid type lignin used in this process. Either method is satisfactory for producing the starting product of the present invention. However, in order to avoid undue variables, the latter is preferred.

Although the economics of the current day industrial operations dictate a continuous process in the continuing effort to avoid human labor the present invention can be best described by batch examples. Therefore, as an alternate to the continuous process, the stepwise process will be outlined in the following passages, the stepwise method having been chosen as more illustrative of the preferred embodiment. When applicable, notation to the continuous process will be injected.

At this point it is important to note that lignins have the capacity to be chemically modified in order to produce an end product with more desirable characteristics for the particular job at hand. The present invention will deal with a detailed description of an unmodified lignin, however, this process has proven to work equally well with metal lignates such as calcium, aluminum, and magnesium. In addition ammonium lignates have been quite successful as well as modified lignins such as hexamethylene tetramine and formaldehyde modified lignins.

Four examples of the present invention are submitted below. Examples I and II are representative of the use of an unmodified lignin. Example III is representative of the uses of a metallic modified lignin. Example IV is representative of the use of an ammonium lignin.

Example I will be illustrative of the detailed steps of the present invention. Examples II, III and IV follow the same procedure as will be illustrated in Example I, therefore in Examples II, III and IV only the significant condition changes are presented.

EXAMPLE I

A good unmodified lignin for use as the preferred practice of the present invention is a lignin sold uder the trade name "Indulin AT." Indulin AT has been produced by Westvaco Corporation in Charleston, S.C. Indulin AT is a solid granular product obtained from the kraft pulping process.

A lignin solution is prepared by slurrying the previously described lignin (trade name Indulin AT) in water. The weight percent of lignin solids in the slurry is held at 15 weight percent. The water used is a distilled water of approximately neutral pH.

Two moles of sodium hydroxide per 1000 molecular weight of lignin were added to the water lignin slurry in order to form sodium lignate. Best results were achieved by allowing the sodium hydroxide and lignin slurry to come to a complete equilibrium. Therefore, the mixture is allowed to stand for a 12 to 16 hour period without agitation and at room temperature.

The next step is to precipitate the dissolved lignin to a slurry form. This is a very critical point in the process because here the size of the particle is predetermined, which is a significant variable in the surface per unit weight ratio. The precipitation of the lignin is accomplished by changing the pH to the acidic side using dilute sulfuric acid. The greater the dispersion, the more superior acid to lignin contact can be achieved. This superior contact produces a small size lignin precipitate. In an effort to further improve the dispersion, the original lignin solution is diluted further to approximately ten weight percent per unit weight of solution. Another point in achieving a good dispersion is to dilute the volume of acid water to twice that of the volume of lignin solution. As the acid water is mixed with the lignin solution, the mixture is agitated at high speed for approximately fifteen minutes. Any good high shear mixer is sufficient for this purpose. AL-1 homomixer was used in the preferred embodiment. The high speed mixer aids in achieving a uniform dispersion of the acid and lignin solution and also to break up the macro-flocs of the precipitate. After agitation the precipitated slurry is ready for heat coagulation without further processing.

At this point some of the slurry is separated out of the mixture and dried conventionally without heat treatment. The data from this representative sample of the slurry which is dried conventionally is compared to the slurry that will be dried after heat treatment. The results of this comparison are seen in Table 1. Runs 1 and 2 are the non-heat treated samples and runs 3 and 4 are the treated samples.

The heat treatment step is initiated. The slurry is directly heated with injected steam. The injected steam can be of low pressure and heats the slurry to a temperature of at least 150 degrees F. and not more than 180 degrees F. It should be noted at this point that if a modified lignin is used the temperature of the sparged steam is somewhat higher. This will be illustrated in Examples III and IV following. Of the various experiments that have been run, the duration of steam injection seems to be without effect on the end product. As per direct heating versus indirect no significant difference in product has been noticed in the various experiments that were carried out. Induction heating has also been tried with success.

The following theory is advanced regarding the heat coagulation of lignin slurry. The temperature of the lignin slurry is increased to approximately the wet melting point of the lignin particles. This temperature varies depending on the type of lignin being used, modified or unmodified. The overall objective of the increase in temperature is not to liquify the lignin particle, but rather to melt the outer surface of the individual lignin particles; therefore this becomes the control criteria. Once this outer surface is melted, two forces come into play. First the naturally occurring attractive forces between particles bring the particles of lignin into contact with each other. This contact is enhanced by agitation of the solution. The second force is the surface tension of the melted lignin on the surfaces of the particles. Once the surfaces of the two lignin particles come into contact the liquified lignin fluid on the surfaces tends to hold the particles together. This mechanism is, of course, the same mechanism experienced at this interface between the two liquid surfaces, i.e. surface tension.

The process as described above repeats itself and the combining of particle to particle increases. An upper limit of this increase or growth is determined by the amount of agitation of the solution. The higher the shear forces the lower the limit of growth for the combining of the particles. The lower the shear forces the higher the limits of growth. At any rate, the growth takes place in an agitated state and the particles do not coagulate into a tight bundle, but rather are linked together in a random, skeleton-like fashion. This skeleton structure is the key to a successful high surface area lignin product. The slurry is allowed to cool, at which time the liquified lignin fluid on the outer surfaces of the particles solidifies and the random skeleton structure is preserved.

Spray drying as a method of removing the supernate from the solid lignin particles is the preferred method of the present invention. It should be noted that other methods of drying can be utilized with equal success, for example fluidized bed and tray drying.

Past experience in spray drying lignins has shown that the inlet drying gas temperature is a critical factor in producing small particle sized material. Superior results have been achieved by maintaining the entering hot gases at 400 degrees F. or below.

It has been speculated that considerable numbers of lignin particles are recirculated in the dryer and are exposed to the inlet gas temperature. In commercial drying of lignin the inlet gases may reach 650 to 700 degrees F. well above the wet melting point of lignin. These high temperatures are sufficient to cause thermal coalescing of the lignin and any small particles which are present will fuse to large particles at only a fraction of the original surface area; therefore in producing the product of the present invention these high temperatures are to be avoided.

Figure 2:
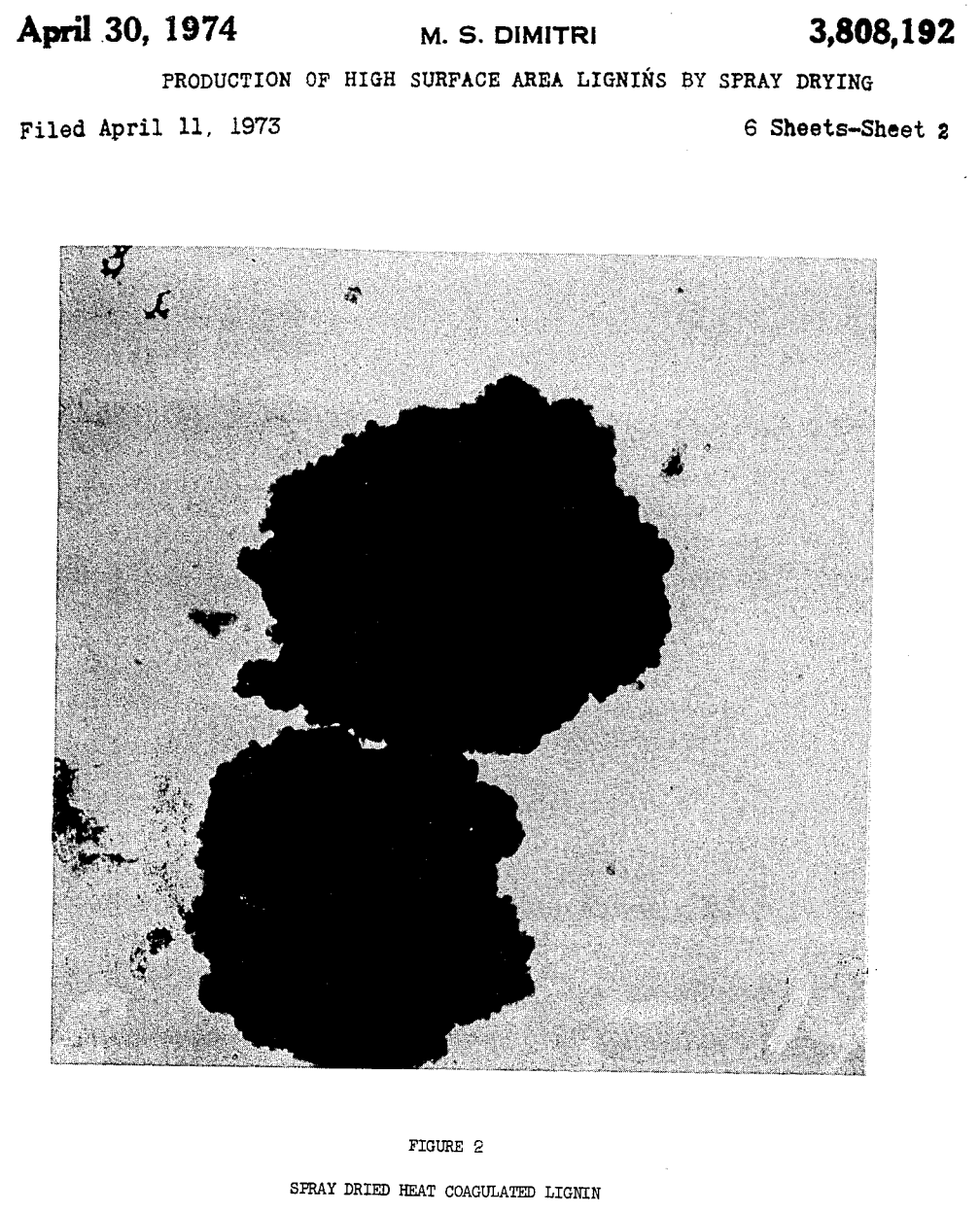

Electron micrograph FIG. 2 illustrates that the heat treatment of lignin slurries gives a partial coalescence of small particles into agglomerates. Forced convection as with spray drying of these agglomerates does not substantially change the particle size of these agglomerates and the surface area though not as large as that of the original precipitated wet particle, is still manyfold times the surface area obtained by drying nonheat coagulated lignins. It should be noted at this point that conventional air drying will also yield high surface area lignins, however because of the increased time requirements this substitute is not the most efficient.

The partial coalescence produced by heat treatment acts to prevent the close packing which occurs with non-heat treated slurries. This is accomplished by the formation of a stable structure in the slurry medium, as is the skeleton structure noted above. Without heat coagulation the movement of precipitated particles is unrestricted and close packing results, forming dense particles with extremely small surface areas. Electron micrographs of the heat treated slurry show extremely small particles in random clusters with the original precipitated particles maintaining for the most part their initial size and shape.

As noted above the results of heat treated spray dried lignin were compared to a non-heat treated spray dried lignin. The results of all runs are reported in Table 1 following. Runs 1 and 2 were dried without heat treatment and runs 3 and 4 were treated.

EXAMPLE II

This example is illustrative of the highest surface area achieved using the method of the present invention on an unmodified lignin. The procedural steps are exactly as in Example I with the changes as noted following.

Figure 3:
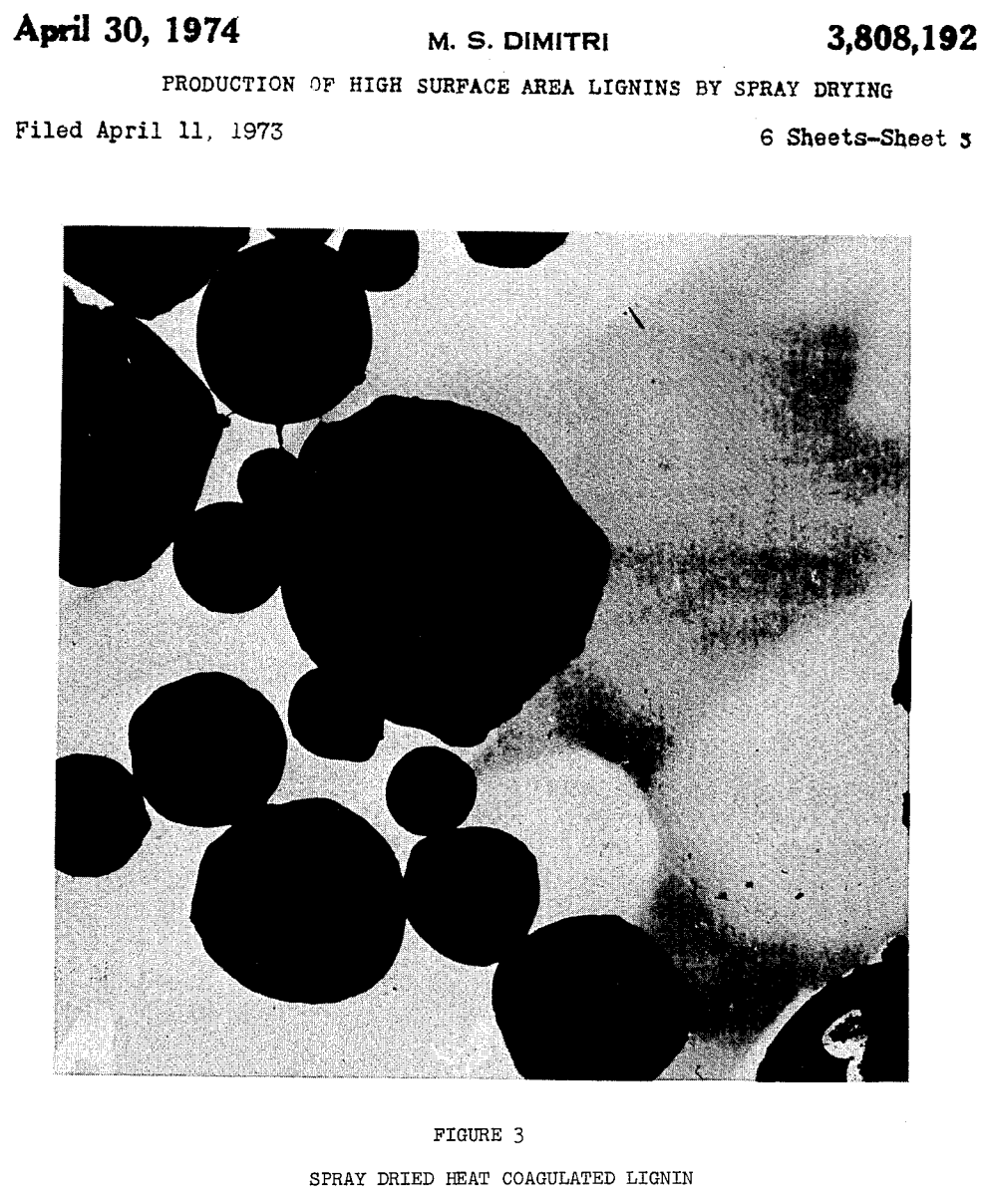

8000 grams of a sodium lignate solution containing 620 grams of lignin is mixed with 16,000 grams of a dilute sulfuric acid solution using a high shear mixer. The lignin is precipitated and the slurry is heated to 180 degrees F. with direct steam injection. The coagulated mass is filtered and washed using a Büchner filter. The filter cake is redispersed with water and spray dried with a dryer inlet gas temperature of 400 degrees F. and an outlet temperature of 200 degrees F. The dry product is analyzed for surface area and found to have 104.2 m.$^2$/g. The results of Example II are reported in run number 5, Table 1, and are pictured in FIG. 3.

EXAMPLE III

Example III is illustrative of the use of a modified metal lignate in the practice of the present invention. The procedural steps are exactly as in Example I with the changes as noted following.

Figure 4:
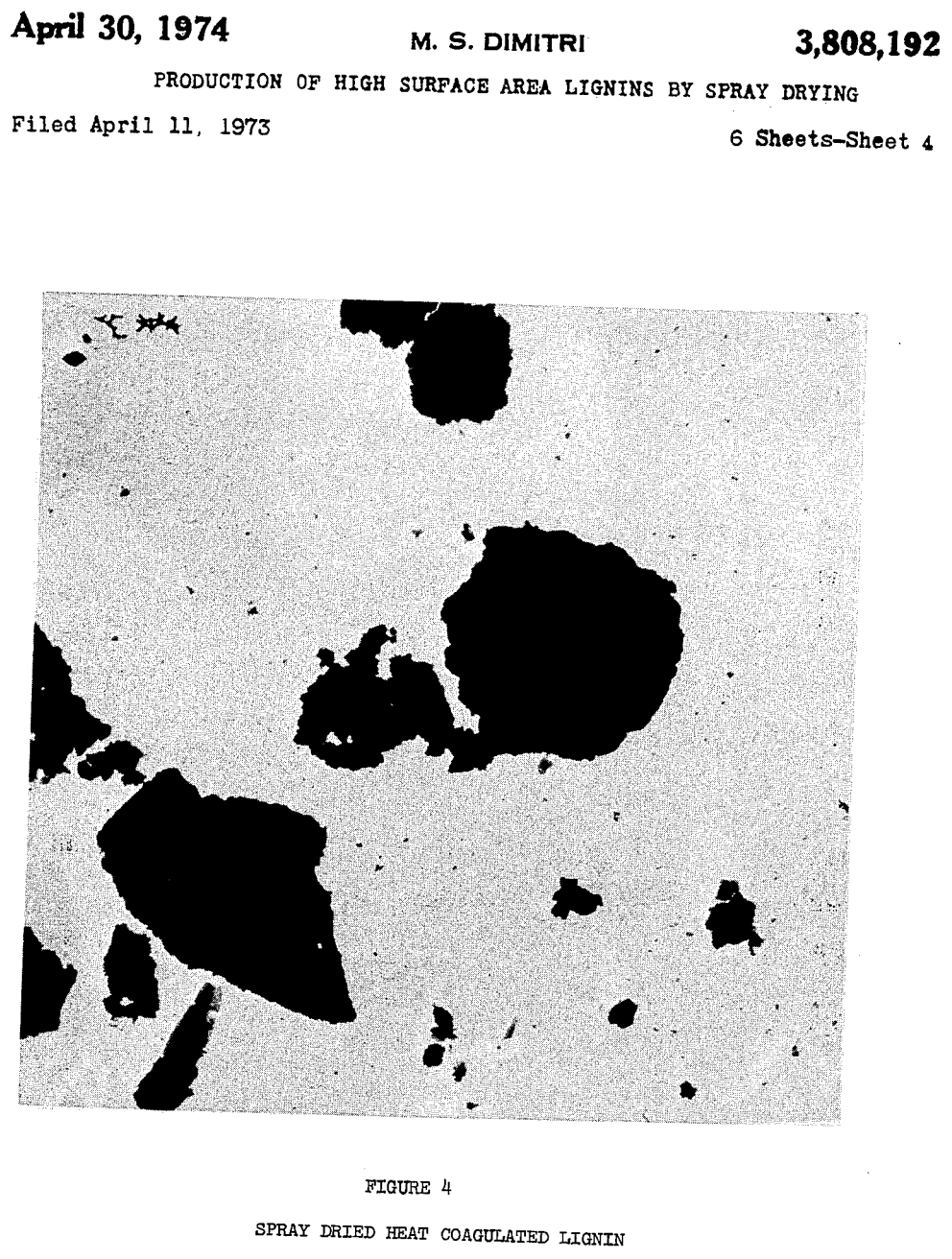

2000 grams of a sodium lignate solution containing 150 grams of lignin is mixed with 4200 grams of a 5% alum solution with a high shear mixer. The precipitated aluminum lignate slurry is heated to 200 degrees F. with direct steam injection. The coagulated slurry is filtered and washed. The filter cake is redispersed with water, and spray dried using a dryer inlet temperature of 365 degrees F. and an outlet temperature of 200 degrees F. The dried product was found to have a surface area of 120.4 m.$^2$/g. The results of Example III are reported in run number 6, Table I, and are pictured in FIG. 4.

EXAMPLE IV

Example IV is illustrative of the use of a modified ammonium lignate in the practice of the present invention. The procedural steps are exactly as in Example I with the changes as noted following.

2000 grams of an ammonium lignate solution is mixed with 10,500 grams of a 1.5% sulfurous acid solution using a high shear mixer. One half of the slurry is spray dried at a dryer inlet temperature of 300 degrees F. and 145 degrees F. outlet temperature. The dry product had a surface area of 1.7 m.$^2$/g. The other portion of the slurry is heated with direct steam injection to 180 degrees F. and spray dried at the same dryer conditions used in (2). The dried product had a surface area of 30.7 m.$^2$/g. The results of Example IV are reported in run number 6, Table 1, and are pictured in FIG. 5.

TABLE 1.—SURFACE AREAS OF SPRAY DRIED LIGNINS

| Run No. | Example | Figure | Class | Material | Sparged steam, °F. | Surface area, m.$^2$/g. | Spray dryer temperature, °F. | |
|---|---|---|---|---|---|---|---|---|
| | | | | | | | Inlet | Outlet |
| 1 | I | 1 | Unmodified | Alkali lignin | None | 1.7 | 400 | 200 |
| 2 | I | 1 | do | do | None | 1.4 | 400 | 200 |
| 3 | I | 2 | do | do | 150 | 30.7 | 400 | 200 |
| 4 | I | 2 | do | do | 150 | 21.4 | 400 | 200 |
| 5 | II | 3 | do | do | 180 | 104.2 | 400 | 200 |
| 6 | III | 4 | Modified | Aluminum lignate | 200 | 120.4 | 365 | 200 |
| 7 | IV | 5 | do | Ammonium lignate | 180 | 30.7 | 300 | 145 |
| 8 | IV | 5 | do | do | None | 1.7 | 300 | 145 |

Figure 1:
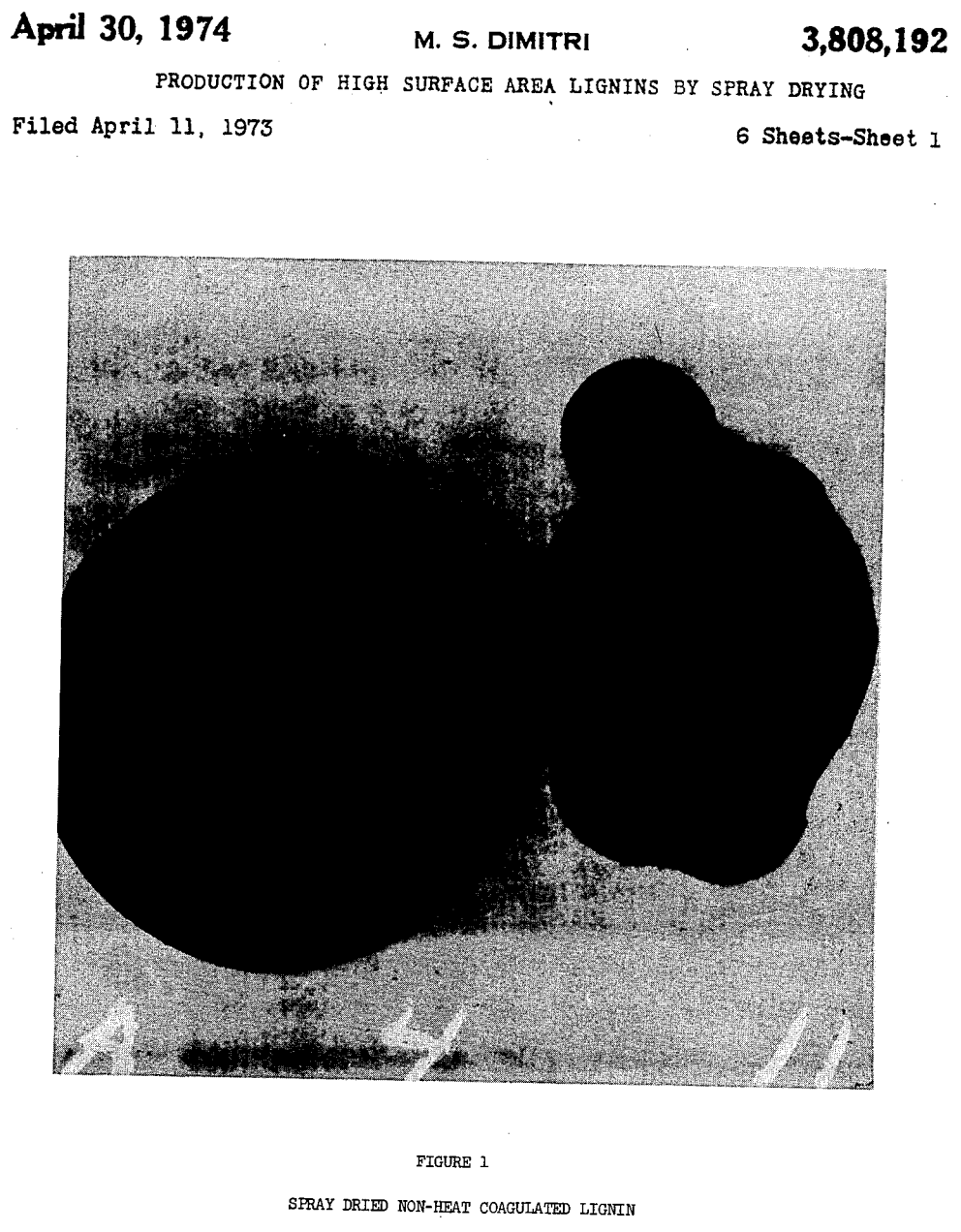

It should be pointed out that the production of lignins with surface areas above 1 to 2 square meters per gram by spray drying is significant. Electron micrographs of the products establish the shape and character of the particles. The non-heat treated lignin is illustrated in FIG. 1. FIGS. 2–5 are examples of heat treatment. The particles are porous particles, probably spherical, larger than 10 microns because the powder was collected in a conventional cyclone collector.

The precipitation or flocculation conditions of the present invention are of major significance. In runs 1 through 8 conditions were chosen in an effort to insure the precipitation of lignin in small particles. As noted above, this is very critical to the production of high surface area lignins. The low surface area products of non-heat treated runs 1 and 2 suggested that the small particles had closely packed in drying to form dense units, probably spherically conforming to the droplet state in the final stages of drying. The electron micrograph FIG. 1 when compared to FIGS. 2–5 verified the hypothesis presented above and also indicated why the heat treated material produces the high surface area lignins.

Electron micrographs were made at the Georgia Institute of Technology. FIG. 1 is a photograph of the non-heat treated lignin with a surface area of approximately 1.7 square meters per gram; FIG. 2 is a photograph of the heat coagulated lignin with a surface area of approximately 30.7 square meters per gram. The photographs indicate that spheres were formed in all cases. The non-heat treated sample, FIG. 1, exhibits spheres which are dense smooth spheres which show no protrusions even at the magnification of 16,000×. This is an excellent example of close packing of small particles during drying rather than melting. If melting were the mechanism there would be strong necks between the samples rather than the almost indistinguishable connections shown between the spheres in FIGS. 2, 3, 4 and 5. The almost perfect sphericity of the particles in FIG. 1 is also indicative of the closely packing consolidation of particles rather than the distorted spheres which will result from melting. It appears that the dry particles retain the shape of the droplets from which they were formed. All these factors strongly give indication of the formation of spheres from ultra small particles probably less than 200 angstroms.

The pictures of the heat treated samples verify the supposition that the thermal coalescence by direct steam injection forms particles with some degree of structure which do not close pack. This structure apparently reduces close packing by changing particle arrangement and reducing the conformity necessary for the dense symmetrical arrangements associated with this type of agglomeration. In both FIGS. 2, 3, 4 and 5 the roughness of the exterior shows the formation of individual particles into random shapes. It should be pointed out that in both non-heat treated and heat treated lignins the individual particle size appears identical. The fissures and depressions shown on the surface of particles in FIG. 2 is no doubt indicative of sub-surface pattern as well and the higher surface area of the heat coagulated sample can be reasonably attributed to pores and voids between adjacent, agglomerated particles of 200–250 angstroms average particle diameter.

Figure 5:
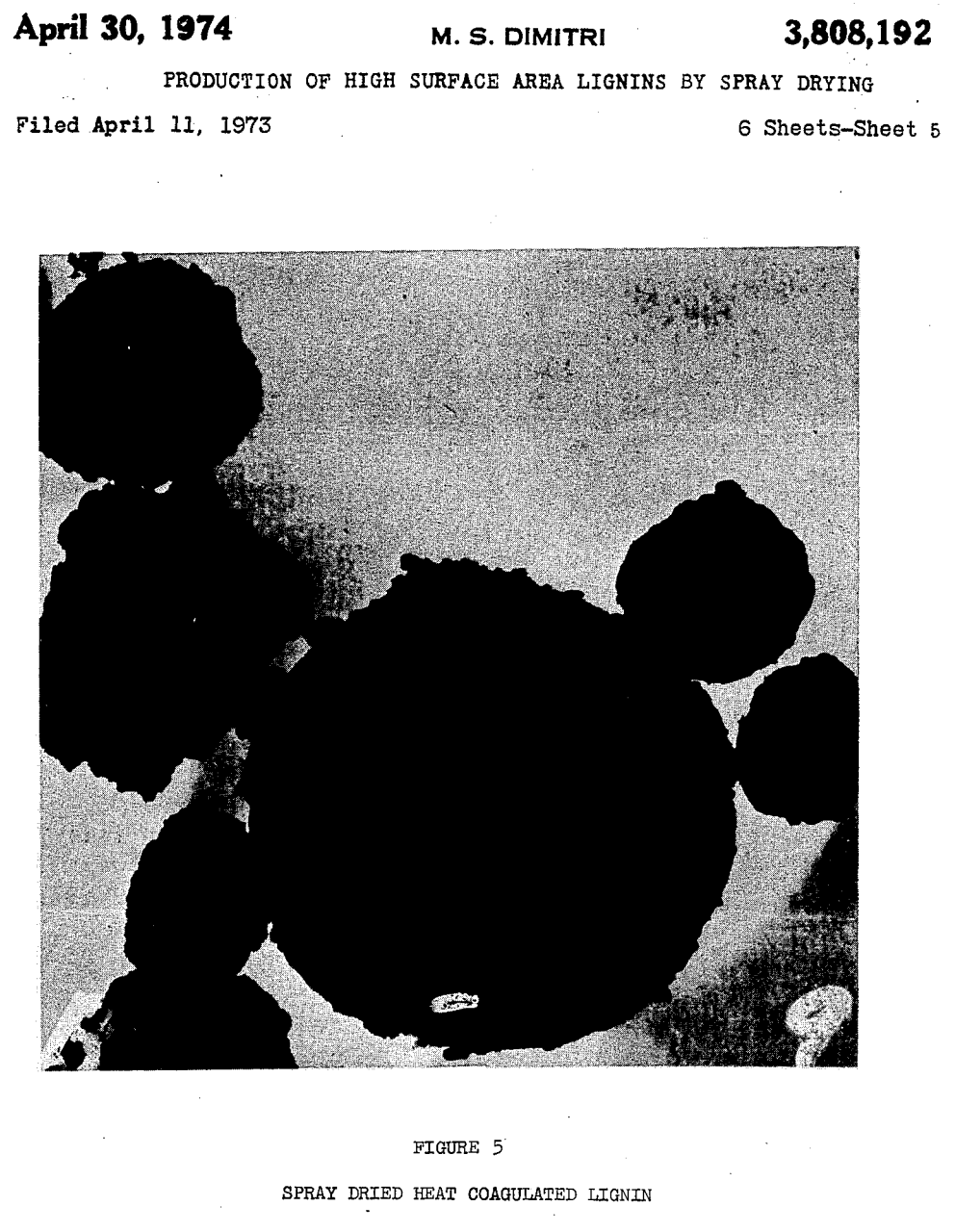

FIG. 6 shows the relation of lignin particle size to surface area. It was calculated on the basis of completely impervious spheres of lignin with a density of 1.3 and indicates the maximum surface area which could be expected. Samples from run 3, Table 1, the heat coagulated lignin, would have to have an average particle diameter of 1500 angstroms or 0.15 micron to have 30.7 m.$^2$/g. surface. It has been determined that the particles from the spray dryer actually have diameters from 10 to 400 microns with an average of 150–200 microns. The most logical explanation based on FIG. 5 is that the heat coagulated product is a porous, agglomerate of particles with an average diameter, from FIG. 6, of 1500 angstroms.

The effectiveness of heat treatment emerges as the most significant feature in producing high surface area lignins. Even with the comparatively low drying temperature, 400 degrees F., and the rapid drying time, less than 5 seconds, non-heat coagulated particles packed into large, dense, solid spheres entirely obliterating the initial particle shape and size.

Because many varying and different embodiments may be made within the scope of the inventive concept herein taught, and because many modifications may be made in the embodiments herein detailed in accordance with the description requirements of the law, it is to be understood that the details herein are to be interpreted as illustrative and not in a limiting sense.

What is claimed is:

1. The process of producing high surface area dry particles of lignin which comprises:
   (a) precipitating lignin particles from solution;
   (b) heating the supernate and the precipitate to approximately the wet melting point of the lignin to cause partial coagulation of the particles; and
   (c) evaporating the supernate from the precipitate to produce dry lignin particles.

2. The process of claim 1 whereby the precipitated particle is of the order of 200 angstroms.

3. The process of claim 1 whereby the heating of the supernate and the precipitate is accomplished by direct injection of steam.

4. The process of claim 1 whereby the evaporation is accomplished in a spray dryer where the atomized particles are of the order of 500 to 5000 microns.

5. The process of claim 1 wherein the lignin is an alkali lignin.

6. The process of claim 1 wherein the lignin is a modified lignin.

7. The process of claim 1 wherein the lignin is a modified lignin selected from the group consisting of metal lignates, ammonium lignates, hexamethylene tetramine modified lignin, and formaldehyde modified lignin.

8. The process of claim 1 wherein the surface area of the dry lignin particles is of the order of 100 square meters per gram.

References Cited

UNITED STATES PATENTS 3,544,460   12/1970   Markham et al. ____ 260—124 R

FOREIGN PATENTS 11,046   8/1962   Japan _____ 260—124 C

LEWIS GOTTS, Primary Examiner

D. R. PHILLIPS, Assistant Examiner

U.S. Cl. X.R.

260—17.5, 124 A, 124 C

PO-1050
(5/69)

UNITED STATES PATENT OFFICE
CERTIFICATE OF CORRECTION

Patent No. 3,808,192                    Dated April 30, 1974

Inventor(s)   Mitchell S. Dimitri

It is certified that error appears in the above-identified patent and that said Letters Patent are hereby corrected as shown below:

Column 1, line 61, after "soda" should be inserted --,--.

Column 3, line 49, "uder" should read --under--.

Column 4, line 8, "AL-1" should read with a break --A L-1--.

Add claim 9.

--9. The process of claim 1 wherein the evaporation is accomplished in a spray dryer and the surface area of the dry lignin particles is of the order of 100 square meters per gram.--

Signed and sealed this 17th day of September 1974.

(SEAL)
Attest:

McCOY M. GIBSON JR.                    C. MARSHALL DANN
Attesting Officer                      Commissioner of Patents